Dec. 18, 1962 W. R. SCHOLLE 3,069,303
PROCESS AND APPARATUS FOR PRODUCING FLEXIBLE CONTAINERS
Filed Feb. 5, 1960 5 Sheets-Sheet 1
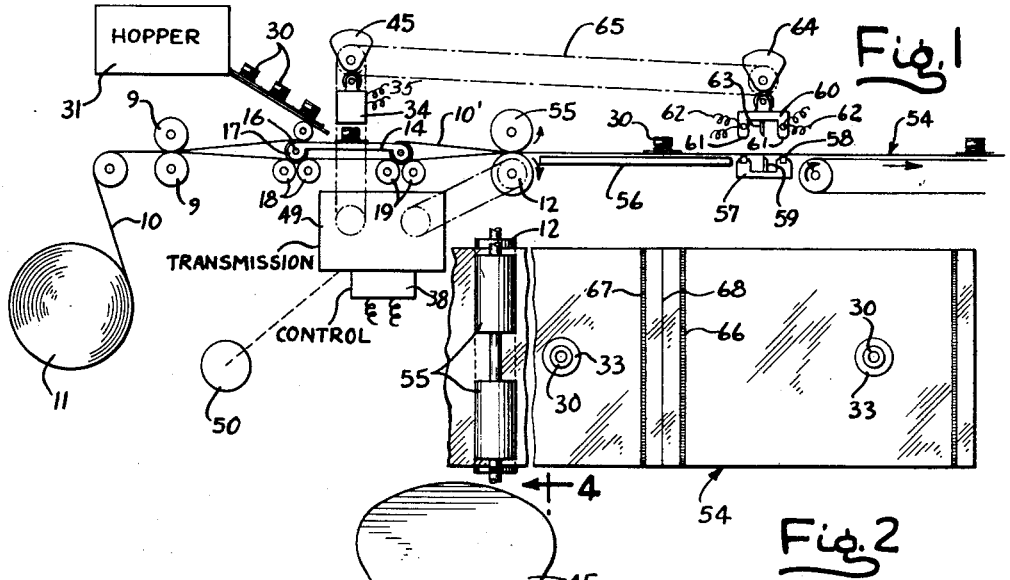
Fig. 1
Fig. 2
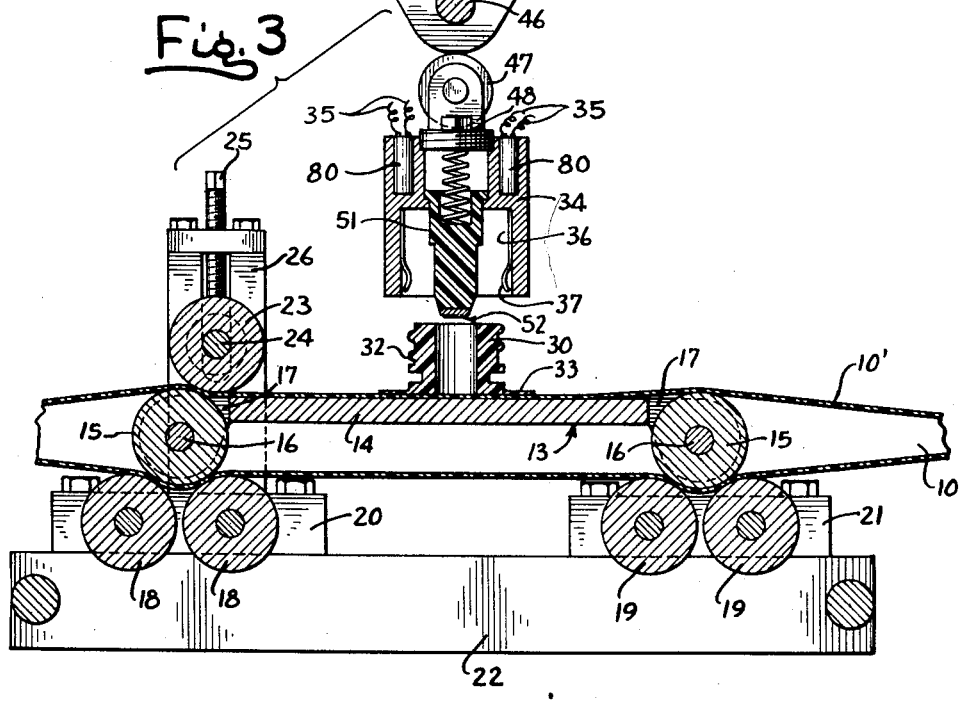
Fig. 3
INVENTOR.
WILLIAM R. SCHOLLE
BY
Darys Desmond & Parker
ATTYS.

Dec. 18, 1962 W. R. SCHOLLE 3,069,303
PROCESS AND APPARATUS FOR PRODUCING FLEXIBLE CONTAINERS
Filed Feb. 5, 1960 5 Sheets-Sheet 2
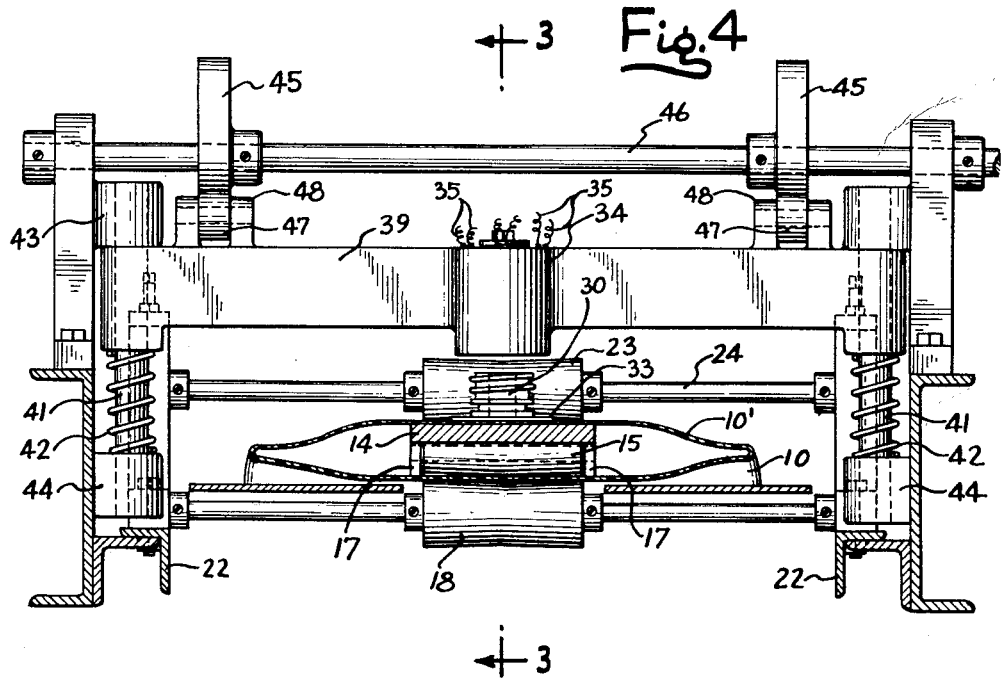
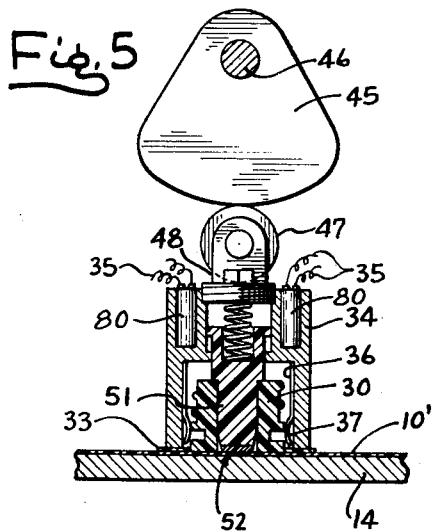
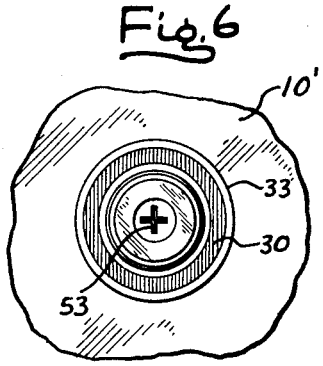
INVENTOR.
WILLIAM R. SCHOLLE
BY
Gary, Desmond & Parker
ATTYS.

Dec. 18, 1962   W. R. SCHOLLE   3,069,303
PROCESS AND APPARATUS FOR PRODUCING FLEXIBLE CONTAINERS
Filed Feb. 5, 1960   5 Sheets-Sheet 3

INVENTOR.
WILLIAM R. SCHOLLE
BY
Gary, Desmond & Parker
ATTYS.

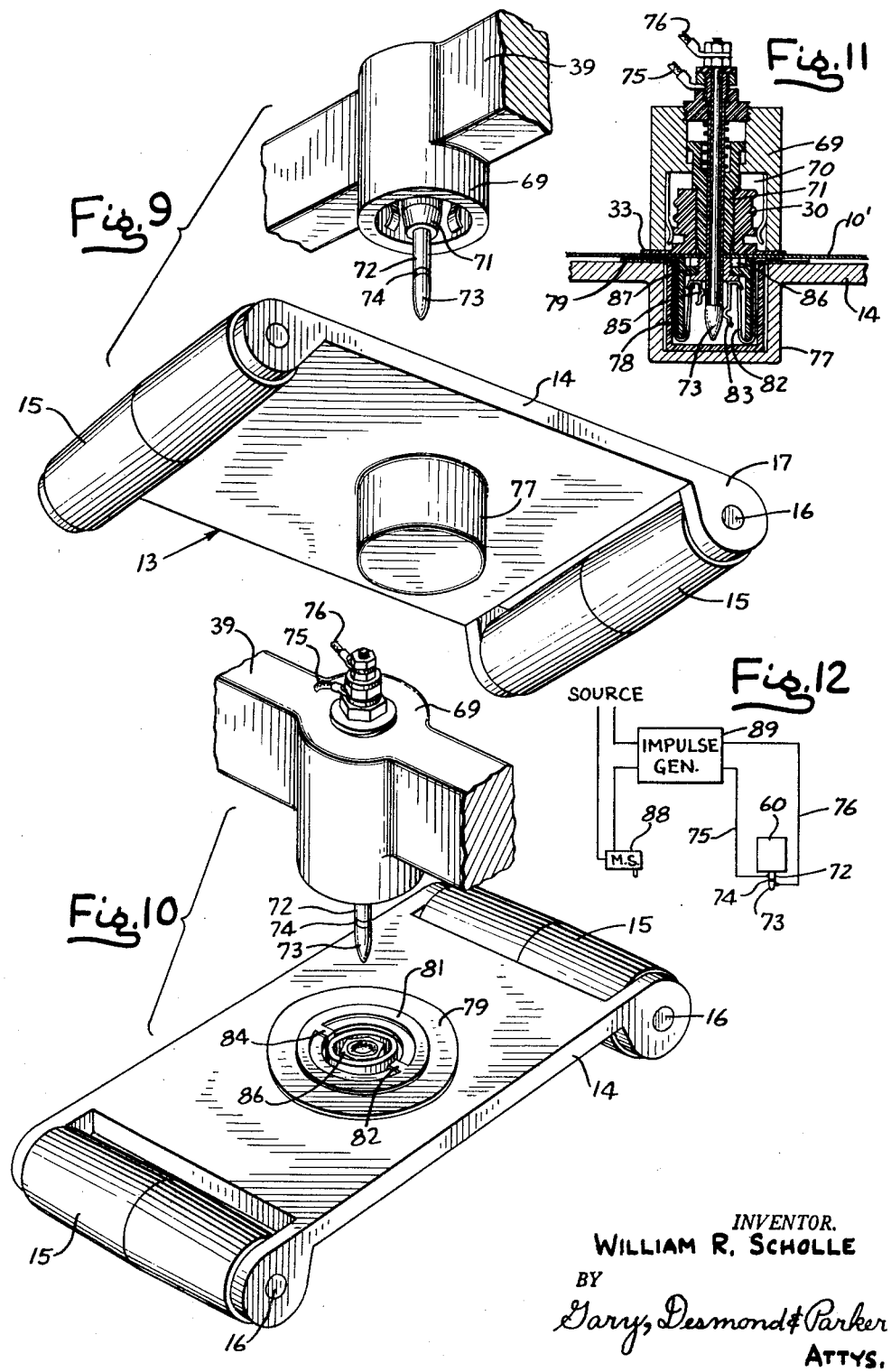

Dec. 18, 1962  W. R. SCHOLLE  3,069,303
PROCESS AND APPARATUS FOR PRODUCING FLEXIBLE CONTAINERS
Filed Feb. 5, 1960  5 Sheets-Sheet 5
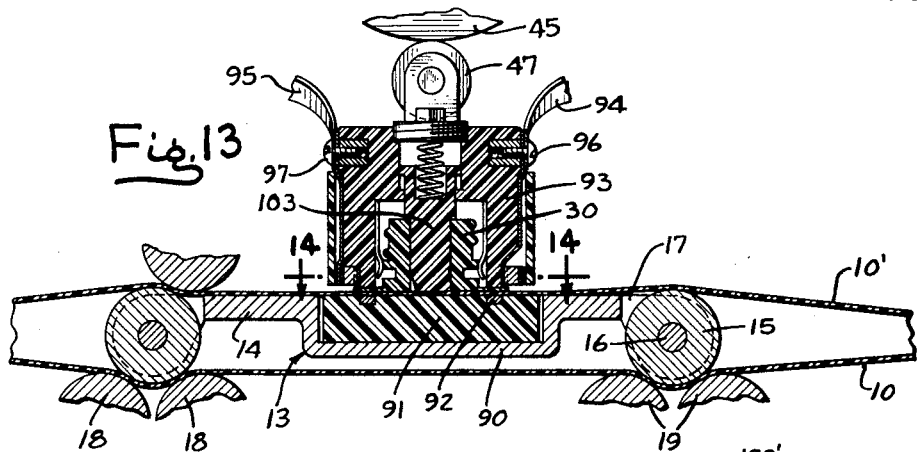
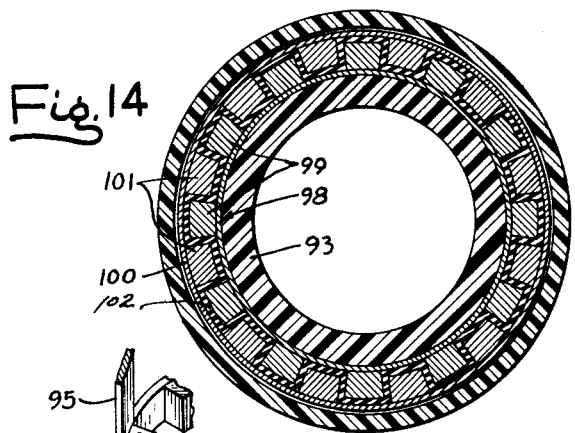
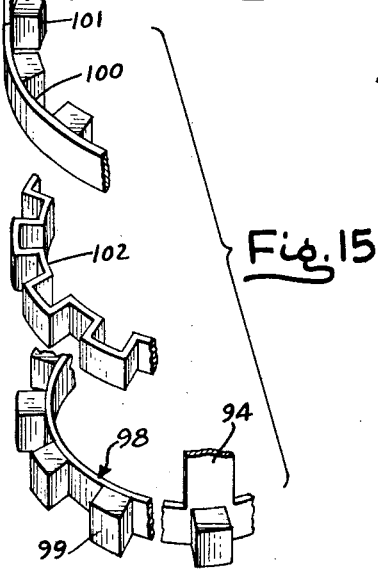
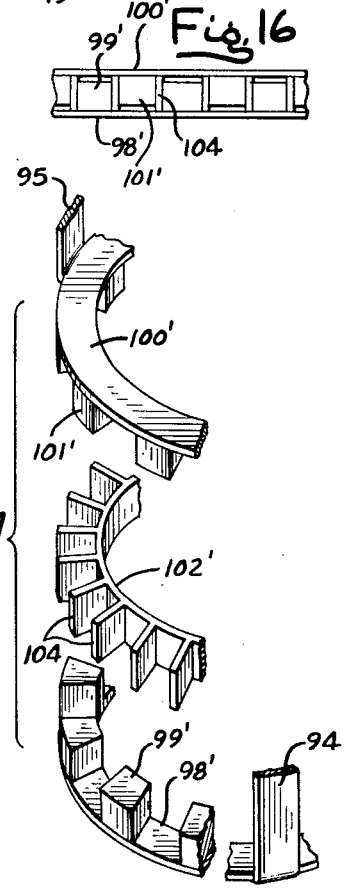
INVENTOR.
WILLIAM R. SCHOLLE
BY
Gary, Desmond & Parker
ATTYS.

3,069,303
PROCESS AND APPARATUS FOR PRODUCING
FLEXIBLE CONTAINERS
William R. Scholle, Newport Beach, Calif., assignor to
Scholle Chemical Corporation, Northlake, Ill., a corporation of Illinois
Filed Feb. 5, 1960, Ser. No. 6,980
14 Claims. (Cl. 156—253)

This invention relates to a novel process and apparatus for producing flexible containers for fluent materials, and to the resulting product.

More particularly, the present invention pertains to a novel method and means for converting tubes of thermoplastic flexible sheet material, in a continuous and automatic manner, into endwise closed containers adapted to be filled with fluent material such as, for example, milk.

It is a particular object of the present invention to provide a novel process and apparatus for securing nozzles, which may be employed for filling and dispensing, to a wall of a flexible thermoplastic tube in the process of converting the tubes to endwise sealed containers, communication with said spout being, if desired, completely closed prior to filling with its intended contents, or in the alternative the embraced side wall may be punctured or cut through at the spout and the latter capped.

It is a further object of the present invention to provide an endwise closed flexible container having a filling and pouring spout thereon which, if not already punctured, may be readily punctured at the time of filling through the spout from a flattened, previously imperforate condition, with such concomitant advantages, in either event, as the ability to retain the container in closed, empty, flattened, sanitary condition prior to filling, and to prevent foaming during filling by reason of filling from flattened condition with absence of air.

As will be apparent, the ability to continuously secure pouring spouts to the flexible container during its process of formation in an automatic manner also represents considerable economy in the production of bags of the class described, and by reason thereof enhances their utility and availability.

Other objects and advantages will be apparent from a consideration of the following specification and accompanying drawings, wherein:

FIG. 1 is a diagrammatic elevational view of an arrangement of apparatus for carrying out the process of the present invention.

FIG. 2 is a fragmentary plan view of the sealed containers as sequentially formed in accordance with the practice of the present invention.

FIG. 3 is a fragmentary longitudinal vertical section of a portion of the apparatus shown in FIG. 1 and taken on the line 3—3 of FIG. 4.

FIG. 4 is a transverse vertical sectional view taken on the line 4—4 of FIG. 3.

FIG. 5 is a fragmentary sectional detail view of a portion of the apparatus shown in FIG. 3 illustrating the sealing collar thereof urged to operative position by the illustrated cam member and thus being a step sequential to that shown in FIG. 3.

FIG. 6 is a fragmentary detail plan view of the spout enlarged from that shown in FIG. 2.

FIGS. 9 and 10 are exploded perspective detail views of a modified form of the present invention.

FIG. 11 is a vertical sectional view of the sealing collar shown in FIGS. 9 and 10.

FIG. 12 is a schematic wiring diagram with reference to the means of FIGS. 9 to 11.

FIG. 13 is a fragmentary longitudinal vertical section, similar to that of FIG. 3, of another modified form of the present invention.

FIG. 14 is a section on the line 14—14 of FIG. 13.

FIG. 15 is an exploded perspective fragmentary detail view of the assembly employed in FIGS. 13 and 14.

FIG. 17 is a view similar to that of FIG. 16 in modified arrangement, and

FIG. 16 is a fragmentary edge view of the assembly of the components of FIG. 17.

Figure 7:
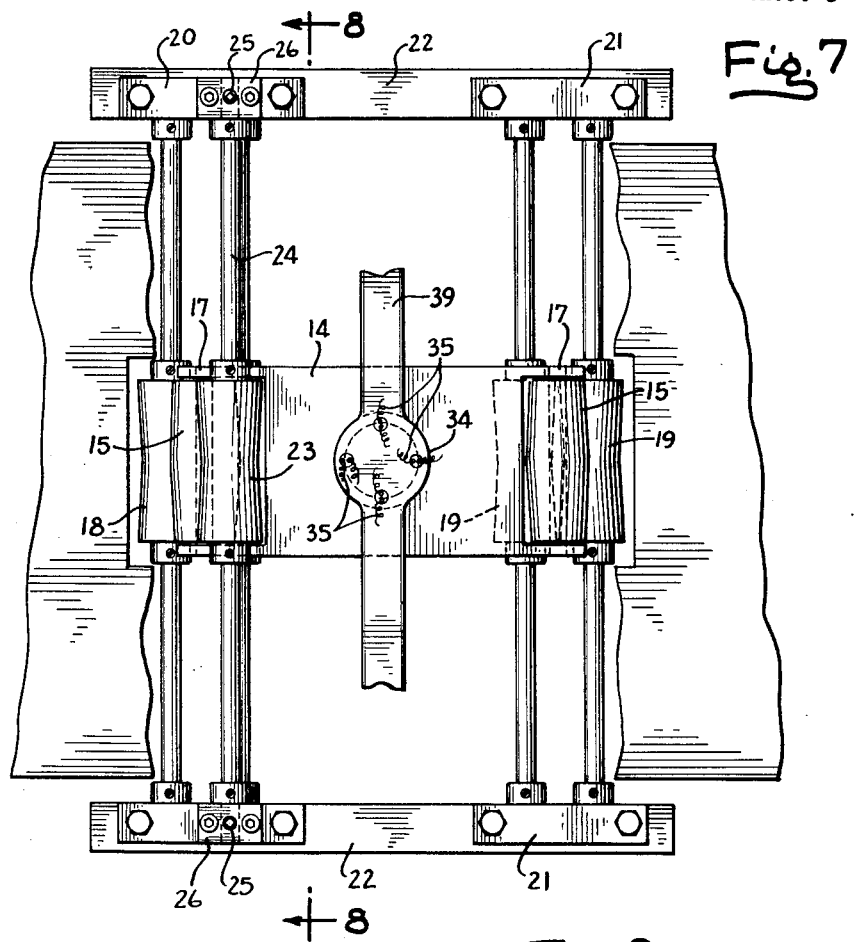
FIG. 7 is a fragmentary plan view, with parts broken away, of the apparatus shown in FIGS. 3 and 4.
Figure 8:
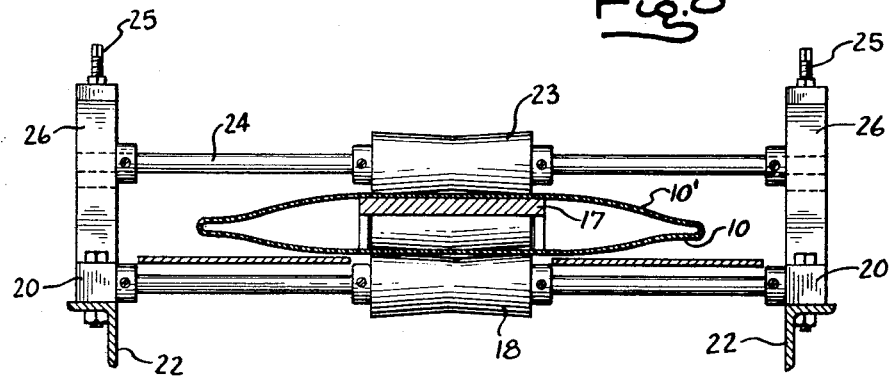
FIG. 8 is a section on the line 8—8 of FIG. 7.

Referring to the drawings, the reference numeral 10 designates a tube of thermoplastic, flexible sheet material such as polyethylene, cellulose acetate, vinyls, polyesters, and the like, which may be of extruded seamless material or sheet material formed with a longitudinal seal, and is drawn from a supply roll 11 in flattened or collapsed form, from between rolls 9, 9.

In accordance with the present invention, predetermined lengths of the tube 10 are continuously intermittently drawn, by means of the driven roller 12, over what is herein designated generally as a floating mandrel 13. This floating mandrel 13 comprises a horizontally disposed platform portion 14 mounted on a pair of rolls 15, 15, preferably crowned as shown, having shafts 16, each journaled in a pair of spaced arms 17, projecting downwardly from and in opposite direction at the opposed ends of the mandrel platform 14. As will be seen from FIG. 3, as the tube 10 is drawn over the mandrel 13 the opposed faces of the flattened tube are spread apart so that the upper face 10′ of the tube is brought into juxtaposition with the mandrel platform portion 14.

The floating mandrel 13 is retained in a cradled manner and in a substantially fixed position, in part by gravity, against the frictional effect of the tube 10 as it is longitudinally drawn thereover, by means of the cradle roll pairs 18, 18 and 19, 19, the axes of these rolls being respectively journaled in the blocks 20 and 21 mounted on the supporting frame member 22. The mandrel 13 is further cradled against lateral movement by providing the rolls 15, 15 with crowns received in the companion medially dished areas of rolls 18, 18 and 19, 19.

If desired, there can in addition be a stop roll 23, the shaft 24 of which is journaled for vertical adjustment by means of the screws 25 in the mounting 26. It will be noted that the axis of roll 23 is offset from that of roll 15 in a direction inwardly of the leading end of mandrel 13 and adjusted by means of the screw 25 so that the periphery of roll 23 may be depressed beneath the highest point of the periphery of the leading roll 15, whereby roll 23 can act as a stop roll to inhibit forward movement of the floating mandrel 13 when the tube 10 is frictionally drawn thereover.

While I have shown and described the floating mandrel 13 cradled within the roll pairs 18, 18 and 19, 19 and further retained, when considered desirable, by the stop roll 23, against movement in operation, if desired other means may be provided in maintaining the floating mandrel in substantially fixed position such as, for example, electromagnetic means not shown, comprising an annular solenoid embracing the tube and mandrel 13, in which case the mandrel platform 14 would be a magnetizable core.

As the tube 10 is drawn from the coil 11 over the floating mandrel 13 and intermittently arrested, nozzles generally indicated as 30 are sequentially supplied from a hopper 31, or other suitable feed means, into substantially predetermined position on the surface 10′ of the tube 10 above the platform 14. The nozzle comprises a relatively rigid spout portion 32 which may be externally threaded as shown or otherwise adapted to receive a closure cap, the nozzle being further provided with a relatively flexible, integral, annular flange 33 composed of thermoplastic material which may be similar to or the same as the composition of tube 10 and which is heat-sealable therewith.

Heat-sealing or fusing of the annular flange 33 to the tube wall 10′ can, in accordance with the practice of the present invention, be automatically accomplished by means of the metallic sealing member or annular collar 34 which may be thermally heated through the electrical resistance means, such as a plurality of resistance elements 80 seated in the body of collar 34, each connected to a pair of electrical leads 35. It will be understood that the elements 80 may be connected in parallel and to a common source actuatable by suitable switch means, as in FIG. 12.

This sealing collar 34 is adapted to receive the wall of nozzle 30 within its bore 36 and to center it therein by the spring means 37 during energization of the electrical resistance elements 80 to effect the indicated heat energization being brought about through suitable switch means actuated by or in timed relationship to the movement of collar 34.

The sealing collar 34 is carried by a yoke 39 and adapted for vertical reciprocation by means shown in FIG. 4 wherein the tubular end portions 40 of yoke 39 are received on slide rods 41 carrying compression springs 42 for normally urging the yoke in spaced relation to the mandrel platform 14. The rods 41 are endwise mounted in bosses 43 and 44 secured to suitable frame portions as shown, and the yoke 39 and its sealing collar 34 are adapted to be urged downwardly against the action of the springs 42 by means of the cams 45, 45 carried on the shaft 46 which act against the rollers 47, 47 journaled as at 48 on the yoke 39. Thus, the cam 45 may be intermittently or continuously actuated through suitable means such as, for example, the transmission 49 driven by suitable means such as motor 50 and control means 38 in timed relationship to the intermittent movement of driven roll 12, so that as lengths of tubing 10 are arrested in spread position over mandrel 13, the spouts 30 become positioned on and secured to a single surface thickness 10′ of the tube 10.

As will be further observed from FIG. 3, the sealing collar 34 carries a shouldered, spring-pressed axial boss 51 of insulating or relatively non-heat conductive material such as, for example, an asbestos fiber-filled thermoset phenolic resin composition. This aids in centering and depressing spout 30 and, if desired, an embossing element 52 can be secured to the outer end of boss 51 so that when the collar 34 is brought into its lowermost position by means of cam 45 the embossing element 52 is resiliently depressed into the tube surface 10′, as shown at 53 in FIG. 6, to define lines or areas which may be subsequently readily severed to provide communication between the spout 30 and the confines of the complete bag 54. In the alternative, the element 52, in combination with platform 14 may be caused to promptly pierce or cut the tube surface 10′, further depending on pressure employed and character of the element 52.

The tube 10 after having the spout 30 secured thereto is then moved forward by means of the draw roll 12 whereat it is collapsed between said roll 12 and the notched roll 55, shown in the form of two roll sections in a single shaft in FIG. 2, it being understood that these rolls are spaced so as to permit by-passing of the spouts 30 now fused to the tube 10.

Thus, the again collapsed tube 10 as it passes between the rolls 12 and 55 moves over a platen 56 wherefrom it passes between a lower fixed element 57 having spaced sealing supports 58, 58 and an intermediate cutting element 59 adapted to cooperate with a companion element 60 having spaced sealing elements 61, 61 and an intermediate knife element 63. The heat sealing elements 61 may be energized through the leads 62 connected to a suitable timing mechanism or switch actuated by movement of the element 60.

This upper sealing and severing element 60 can be suitably actuated through a cam 64 in timed connected relationship, by means such as 65, with the cam 45 and vertically reciprocated on support means not shown but similar to that provided for collar 34, so that as the sealing collar 34 descends and fuses the annular flange of a spout 30 to the upper face 10′ of the tube 10, simultaneously at a spaced point on the tube, the flattened tube length is sealed at two closely spaced points as at 66, 67 shown in FIG. 4 and cut at a line 68 between the seals so as to form an endwise sealed bag 54 having a spout fused, if desired, to an imperforate single thickness thereof, in which condition the bag may remain until the time of filling.

Instead of effecting sealing by the electrically generated heat coming from above, as by heating the sealing collar 34, the heat may come from the mandrel side. Thus, as shown in FIG. 9, the collar 69 on the arms 39 similar to the collar 34, has a cavity 70 for receiving the threaded portion of a spout 30 and an axial boss 71 adapted to enter the opening of the spout. In the present instance the boss 71 is provided with a two-conductor pointed probe consisting of the elements 72 and 73 divided by the insulator 74, the elements 72 and 73 being connected respectively to the electrical leads 75 and 76 at the top of collar 69, the element 73 extending through the tubular element 72, and insulated therefrom as shown in FIG. 11 by a tubular continuation of insualtor 74.

In the present form of the invention, the platform 14 of the floating mandrel 13 is provided with a cup 77 projecting from the underside of the platform 14 and opening to the upper face thereof and is lined with an annular insulating body 78 from which an annular flange of the same or other insulating material, such as for example Teflon 79, projects from the defining edge of the cup 77 and overlies the upper surface of the platform 14, as shown in FIGS. 10 and 11.

Overlying, but of lesser radius than the insulating flange 79, is a flat resistance ring 81 of, for example, Nichrome wire, which has two leads projecting into the insulating lining 78 of cup 77, namely, lead 82 which in turn is connected to a spring element 83 for making contact with probe element 73, and a similar lead 84, opposite to lead 82, which likewise projects into the liner 78 of cup 77 into contact with spring element 85 for making electrical contact with probe element 72 to thereby complete the electrical circuit and to heat resistance ring 81 at such time as the collar 69 is caused to descend.

When the probe descends it of course punctures the bag surface 10 and descends through the annular nut or fitting 86 engaged in the annular flange 87 of the insulating liner 78 in the cup 77. Upon descent of the collar 69 over an engaged spout 30, it presses its flange 33 against the bag layer 10′ and into contact with the resistance ring 81 mounted on the platform 14. At the same time, energizing means are actuated, as for example by means of the microswitch 88 shown in the wiring diagram of FIG. 12 which closes the circuit through suitable means such as impulse generator 89, leading to the probe elements 72 and 73. In this manner the heat for fusing the spout flange 33 to the bag face 10′ is provided through the underface of the bag layers 10′. This is advantageous when it is desired to accomplish the fusing in a shorter time than might be the case when heating from above flange 33, since generally the flange component 33 is thicker than the film 10′.

The microswitch 88 can be located an any suitable point, as will be apparent to those skilled in the art, and for example can be carried by either the collar 69 or some laterally or outwardly disposed portion of the mechanism and adapted to be actuated upon descent of the collar and its arms 39 by cam means such as shown and described with respect to the previous embodiment of the invention. Although not specifically described with respect thereto, it will be understood that similar switch means may be provided for energizing of the resistance heating element described with respect to the first embodiment of the invention.

FIGS. 13 to 17 illustrate another embodiment of the invention insofar as it pertains to means for fusing the annular flange 33 of a spout 30 to the upper surface 10' of a tube in the production of an endwise sealed receptacle or bag therefrom. In this case, heat is provided from the under surface of bag layer 10' while at the same time it retains it imperforate so that the entire bag after formation remains closed and can be maintained sterile until such time as it is desired to fill it and at which time a piercing element is projected through the annulus of spout 30 and communicaiton made therethrough to the confines of the sealed bag 54.

The means for effecting heat of fusion in the present modification is a stray field induction heating method. To this end, the paltform 14 of floating mandrel 13 in this instance is provided with a depression or seat 90, filled with a body of insulating material 91 and seating at the surface thereof an annular ring 92 of conductive material such as brass.

The vertically reciprocable sealing collar 93 in this case is composed of a body of electrical insulating material to which is secured a pair of leads 94 and 95, both of material suitable for this form of invention, such as bronze leads of ½-inch width secured in a suitable manner as at 96 and 97, respectively, to the collar 93. At their lower ends the leads 94 and 95 are connected respectively to annular elements, one of which is electrically negative and the other electrically positive and one of which comprises a band 98 carrying spaced radially outwardly extending blocks 99 of metal such as steel in the one case, and in the other a similar annular band 100 and a plurality of spaced, inwardly radially extending blocks 101. These fit together so that there are alternate electrically negative and positive blocks spaced from each other by the undulating insulating element 102.

When the negative and positive elements are energized through their leads 94 and 95 by means such as that shown and described with respect to FIG. 12 of the previous embodiment, from an alternating current source, a stray field is set up so as to heat the closely adjacent ring 92 due to its proximity to the energized elements 99 and 101 which embrace the collar 33 adjacent the lower end thereof. Thus, when a spout 30 is disposed on the surface 10' of the tubular material 10 as the latter is drawn over mandrel 13, and the spout entered by means of the spring-pressed boss 103, flange 33 is pressed by means of the lower edge of collar 93 against an area of the bag surface 10' overlying ring 92. Simultaneously the ring 92 is heated sufficiently by the stray field of induction elements 99 and 101 to a sufficient extent to fuse the bag surface 10' to the spout flange 33 without rupturing the bag surface 10'.

FIGS. 16 and 17 show an arrangement functionally similar to that of FIG. 15 but structurally modified, in that in this case a lead 95 extends normally to a band 100' from which the poles or metal blocks 101' project vertically; similarly in this case the lead 94 extends normally to a band 98' and the poles or metal blocks 99' project vertically upwardly. Spacing these is the insulating member 102' which in this case has the outwardly radially projecting element 104. The three elements of FIG. 16 when connected together are illustrated in the side edge view of FIG. 16.

It will thus be apparent that I have provided a plurality of methods and means for fusing the flange 33 of spout 30 to the bag surface 10' by heating in a direction through the flange 33 or through the underface of the bag surface 10' and with or without puncturing the bag surface 10' in the process.

Another means for fusing the flange 33 of the spout 30 to the bag surface 10' is by the employment of ultra-high-frequency sound for fusing the plastics without generation of heat while employing a floating mandrel disposed within the confines of tube 10 in the general manner as hereinbefore described.

Although I have shown the preferred forms of my invention, it will be understood that various other changes may be made in details and techniques without departing from the scope thereof, as hereinafter claimed.

I claim:

1. The method of sealing an integral annular flexible thermoplastic flange of a spout element to a surface area of a flexible tube of thermoplastic sheet material which comprises drawing a length of said tube over a relatively stationary floating mandrel disposed within the tube confines, disposing the spout element thereabove, pressing its flange into engagement with the tube surface carried above and against said mandrel, and fusing the thermoplastic materials together thereon.

2. The method of sealing an integral annular flexible thermoplastic flange of a spout element to an imperforate surface area of a flexible tube of thermoplastic sheet material which comprises drawing a length of said tube over a relatively stationary floating mandrel disposed within the tube confines, disposing the spout element thereabove, pressing its flange into engagement with the tube surface carried above and against said mandrel, fusing the thermoplastic materials together thereon and embossing the tube surface embraced by the spout to facilitate subsequent perforation thereat.

3. The method of sealing an integral annular flexible thermoplastic flange of a spout element to an imperforate surface area of a flexible tube of thermoplastic sheet material which comprises drawing a length of said tube over a relatively stationary floating mandrel disposed within the tube confines, disposing the spout element thereabove, pressing its flange into engagement with the tube surface carried above and against said mandrel, fusing the thermoplastic materials together thereon from a heat source carried by said mandrel and perforating the tube surface embraced by the spout.

4. The method of sealing integral annular flexible thermoplastic flanges of spout elements to longitudinally spaced surface areas of a flexible tube of thermoplastic sheet material which comprises intermittently drawing a length of said tube over a relatively stationary floating mandrel disposed within the tube confines, and while movement of the tube is arrested disposing a spout element thereabove, pressing its flange into engagement with the tube surface carried above and against said mandrel, and fusing the thermoplastic materials together thereon by directing heat against the inner surface of said tube disposed beneath said flange.

5. In a continuous method of forming endwise sealed containers and sealing an integral annular flexible thermoplastic flange of a spout element to a surface area of the container which comprises drawing a length of a flexible tube of thermoplastic film material over a relatively stationary floating mandrel disposed within the tube confines, disposing the spout element thereabove, pressing its flange into engagement with the tube surface carried above and against said mandrel and fusing the thermoplastic materials together thereon from a heat source carried at least in part by said mandrel, then drawing the tube and its adhered spout outwardly of said mandrel, collapsing it to flattened tubular form and transversely fusing the opposed flattened layers together at longitudinally spaced lines on opposite sides of said spout.

6. In a continuous method of forming sealed containers and for fusing integral annular flexible thermoplastic flanges of spout elements to longitudinally spaced surface areas of the container which comprises intermittently drawing a length of a flexible tube of thermoplastic film material from a flattened coil thereof over a relatively stationary floating mandrel disposed within the tube confines, and while movement of the tube is arrested disposing a spout element thereabove, pressing its flange into engagement with the tube surface carried above and against said mandrel and fusing the thermoplastic materials together thereon by directing heat against the inner surface of said tube disposed beneath said flange from an electrical heating element carried by said mandrel and energized through connector means projected through the tube surface embraced by said spout, then drawing the tube and its adhered spout outwardly of said mandrel, collapsing it to flattened tubular form, transversely fusing the opposed flattened layers together at longitudinally spaced pairs of lines on opposite sides of said spout, and severing the tube between said pairs of seal lines to form individual endwise sealed tubular containers.

7. Means for sealing an integral annular flexible thermoplastic flange of a spout element to a surface area of a flexible tube of thermoplastic sheet material intermittently drawn from a length of said tube, which comprises a floating mandrel adapted to be disposed within the tube confines, means for maintaining said mandrel stationary relative to the movement of the tube while disposing a spout element thereabove, means for pressing its flange into engagement with the tube surface carried above and against said mandrel, and means for fusing the thermoplastic materials together thereon.

8. Means for sealing an integral annular flexible thermoplastic flange of a spout element to a surface area of a flexible tube of thermoplastic sheet material intermittently drawn from a length of said tube, which comprises a floating mandrel adapted to be disposed within the tube confines, means for maintaining said mandrel stationary relative to the movement of the tube while disposing a spout element thereabove, annular means for embracing said spout and pressing its flange into engagement with the tube surface carried above and against said mandrel, and heating means carried by said pressing means for fusing the thermoplastic materials together thereon.

9. Means for sealing an integral annular flexible thermoplastic flange of a spout element to a surface area of a flexible tube of thermoplastic sheet material intermittently drawn from a length of said tube, which comprises a floating mandrel adapted to be disposed within the tube confines, means for maintaining said mandrel stationary relative to the movement of the tube while disposing a spout element thereabove, means for pressing its flange into engagement with the tube surface carried above and against said mandrel, and heating means carried by said mandrel in juxtaposition to said pressing means for fusing the thermoplastic materials together thereon.

10. Means for sealing an integral annular flexible thermoplastic flange of a spout element to a surface area of a flexible tube of thermoplastic sheet material intermittently drawn from a length of said tube, which comprises a floating mandrel adapted to be disposed within the tube confines, cradle means for maintaining said mandrel stationary relative to the movement of the tube while disposing a spout element thereabove, annular sealing means for pressing its flange into engagement with the tube surface carried above and against said mandrel, and means for fusing the thermoplastic materials together thereon carried, at least in part, by said mandrel.

11. Means for continuously forming endwise sealed tubular containers and for sealing an integral annular flexible thermoplastic flange of a spout element to a surface area of the container which comprises a mandrel, means for intermittently drawing a length of a flexible tube of thermoplastic film material over said mandrel while it is disposed within the tube confines, means for maintaining said mandrel in a relatively stationary floating position with respect to the tube movement, annular vertically reciprocable sealing means for engaging a spout and pressing its flange into engagement with the tube surface carried above and against said mandrel, means for fusing said thermoplastic materials together thereat comprising an electric heating element carried by said mandrel energizable from a source carried by said sealing means, means for collapsing the tube to flattened tubular form and means transversely fusing the opposed flattened layers together at longitudinally spaced pairs of lines on opposite sides of said spout after the tube has passed over and away from said mandrel.

12. Means for sealing an integral annular flexible thermoplastic flange of a spout element to a surface area of a flexible tube of thermoplastic sheet material intermittently drawn from a length of said tube, comprising a floating mandrel including leading and trailing end supporting rolls therefor adapted to be disposed within the tube confines, an annularly disposed electrical heating element seated in said mandrel and cradling roll pair means on a fixed support disposed beneath the mandrel for nesting the respective mandrel rolls and for supporting and maintaining said mandrel stationary relative to the movement of the tube while disposing and sealing a spout element thereabove.

13. Means for sealing an integral annular flexible thermoplastic flange of a spout element to a surface area of a flexible tube of thermoplastic sheet material intermittently drawn from a length of said tube, which comprises a floating mandrel including leading and trailing end supporting rolls thereof adapted to be disposed within the tube confines, cradling roll pair means disposed beneath the mandrel for nesting the respective mandrel rolls and for supporting and maintaining said mandrel stationary relative to the movement of the tube while disposing and sealing a spout element thereabove, and a parallel stop roll disposed above and inwardly of the head roll on the mandrel for aiding in maintaining it stationary relative to the movement of tube material drawn over the mandrel.

14. Means for sealing an integral annular flexible thermoplastic flange of a spout element to a surface area of a flexible tube of thermoplastic sheet material intermittently drawn from length of said tube, which comprises a floating mandrel adapted to be disposed within the tube confines, means for maintaining said mandrel stationary relative to the movement of the tube while disposing a spout element thereabove, annular means for pressing said flange into engagement with the tube surface carried above and against said mandrel, means for fusing said thermoplastic materials together thereon comprising a heat source carried by said mandrel, and spring and cam means for alternately urging said sealing means out of and into operative relationship for intermittently and successively securing spouts of the class described to longitudinally spaced positions on a continuous length of said tubing.

References Cited in the file of this patent

UNITED STATES PATENTS

| | | |
|---|---|---|
| 2,206,965 | Lasko | July 9, 1940 |
| 2,344,369 | Salfisberg | Mar. 14, 1944 |
| 2,467,879 | Billeb | Apr. 19, 1949 |
| 2,479,375 | Langer | Aug. 16, 1949 |
| 2,490,930 | Thompson | Dec. 13, 1949 |
| 2,689,678 | Wendt | Sept. 21, 1954 |
| 2,961,930 | Wamsley | Nov. 29, 1960 |
| 2,973,697 | Lerner | Mar. 7, 1961 |